(12) United States Patent
Wang et al.

(10) Patent No.: US 7,884,624 B2
(45) Date of Patent: Feb. 8, 2011

(54) CAPACITANCE SENSING STRUCTURE (75) Inventors: Horng-Jou Wang, Taoyuan Hsien (TW);
Hsieh-Shen Hsieh, Taoyuan Hsien (TW); Chao-Jui Liang, Taoyuan Hsien (TW); Cheng-Chang Lee, Taoyuan Hsien (TW); Chao-Qing Wang, Taoyuan Hsien (TW); Zong-Ting Yuan, Taoyuan Hsien (TW); Huang-Kun Chen, Taoyuan Hsien (TW); Tai-Kang Shing, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 543 days.

(21) Appl. No.: 11/956,527

(22) Filed: Dec. 14, 2007

(65) Prior Publication Data

US 2008/0150554 A1 Jun. 26, 2008

(30) Foreign Application Priority Data

Dec. 22, 2006 (TW) .............................. 95148390 A (51) Int. Cl.
*G01R 27/26* (2006.01)

(52) U.S. Cl. .................... 324/686; 324/661; 324/658

(58) Field of Classification Search ................. 324/686, 324/658, 649, 600, 660–664, 671, 688, 689; 73/780, 862.043; 702/47, 52; 382/124
See application file for complete search history.

(56) References Cited

U.S. PATENT DOCUMENTS

| 6,465,271 | B1 * | 10/2002 | Ko et al. ........................ 438/48 |
| 6,900,644 | B2 * | 5/2005 | Chou et al. .................. 324/661 |
| 7,009,410 | B2 * | 3/2006 | Ito et al. ...................... 324/690 |
| 7,123,026 | B2 * | 10/2006 | Sato et al. ................... 324/658 |
| 7,398,587 | B2 * | 7/2008 | Morimoto ................... 29/592.1 |
| 2004/0008037 | A1 * | 1/2004 | Chiba .......................... 324/658 |
| 2005/0001633 | A1 * | 1/2005 | Okushima et al. ........... 324/658 |
| 2006/0186901 | A1 * | 8/2006 | Itakura et al. ............... 324/689 |
| 2007/0115121 | A1 * | 5/2007 | Schleeh ....................... 340/562 |

* cited by examiner

*Primary Examiner*—Haoi-an D Nguyen
(74) *Attorney, Agent, or Firm*—Birch, Stewart, Kolasch & Birch, LLP (57) ABSTRACT A capacitance sensing structure includes a substrate, a sensing electrode layer, at least one stack layer and a conductive body. The sensing electrode layer is formed on or in the substrate. The stack layer is formed on the sensing electrode layer. The conductive body is disposed over and corresponding to the sensing electrode layer and the stack layer.

20 Claims, 8 Drawing Sheets

CAPACITANCE SENSING STRUCTURE

CROSS REFERENCE TO RELATED APPLICATIONS

This Non-provisional application claims priority under 35 U.S.C. §119(a) on Patent Application No(s). 095148390 filed in Taiwan, Republic of China on Dec. 22, 2006, the entire contents of which are hereby incorporated by reference.

BACKGROUND OF THE INVENTION

1. Field of Invention

The invention relates to a sensing structure, and in particular, to a capacitance sensing structure.

2. Related Art

With the enhancement of the semiconductor manufacturing technology, micro-electromechanical devices applied to a micro-electromechanical system (MEMS) are commonly manufactured using the complementary metal-oxide semiconductor (CMOS) technology.

The micro-electromechanical device manufactured according to the prior art has a suspended conductive structure serving as a sensing unit, which receives an external action to move the suspended conductive structure relative to a fixed conductive structure. A variation between the suspended conductive structure and the fixed conductive structure may be sensed so that a sensed value may be calculated. In the following example, a capacitive micro-accelerometer senses a variation of capacitance to derive a value of acceleration. The micro-accelerometers may be classified into an out-of-plane sensing mechanism and an in-plane sensing mechanism for respectively sensing a vertical variation and a lateral variation according to the structure design.

Figure 1:
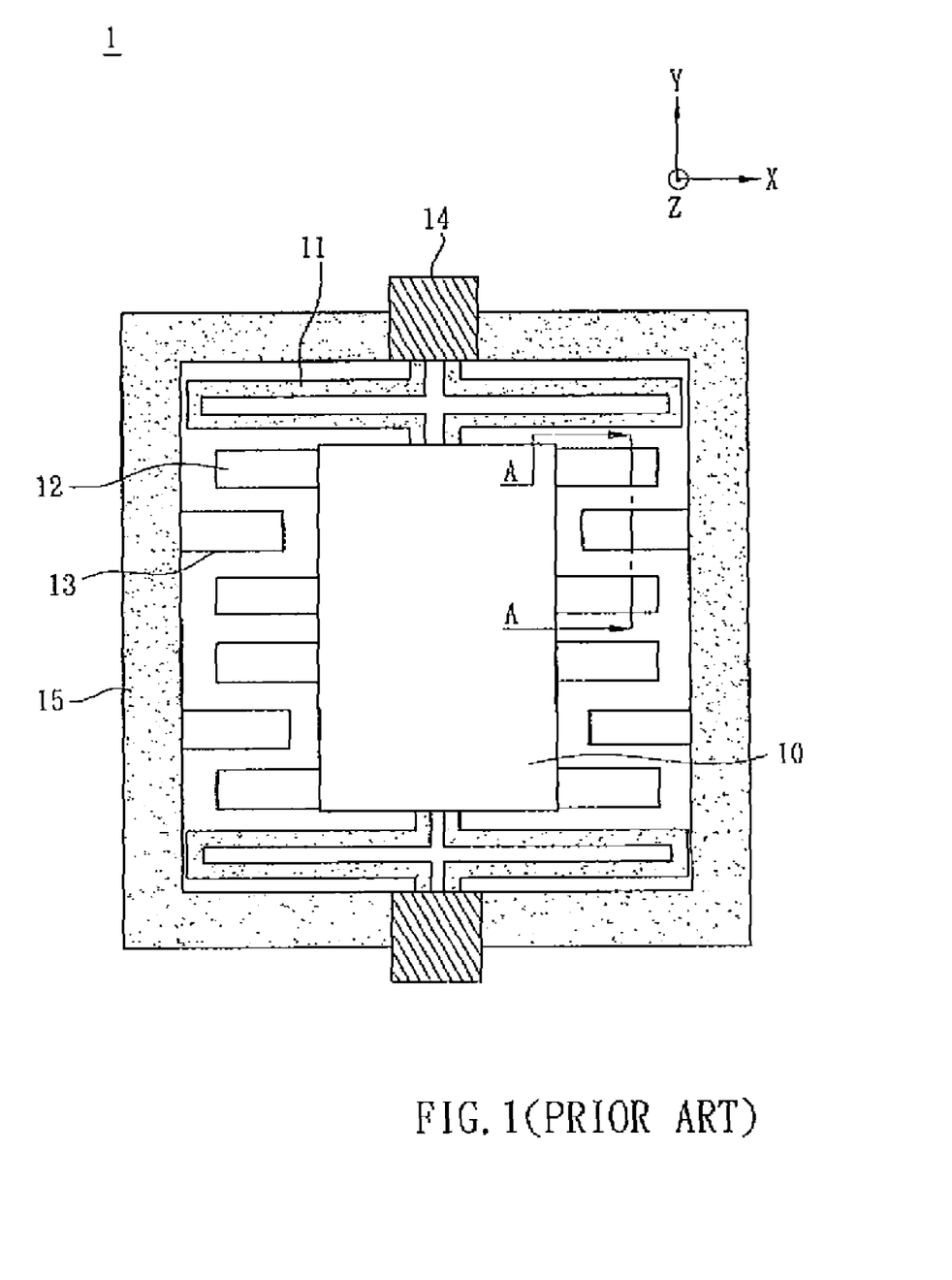
FIG. 1 is a schematic illustration showing a conventional out-of-plane capacitive micro-accelerometer.

Referring to FIG. 1, a conventional out-of-plane capacitive micro-accelerometer 1 includes a proof mass 10, a flexible portion 11, a first comb-shaped electrode 12 and a second comb-shaped electrode 13. The capacitive micro-accelerometer 1 is manufactured by a CMOS manufacturing process of stacking a plurality of conductive layers and a plurality of dielectric layers alternately, and patterning the conductive layers to form longitudinal first comb-shaped electrodes 12 and longitudinal second comb-shaped electrodes 13, which serve as a sensing structure during the stacking process. Finally, the dielectric layers in some regions are removed by way of etching so that the first comb-shaped electrodes 12 and the second comb-shaped electrodes 13 are suspended. The proof mass 10 is connected with a fixing end 14 through the flexible portion 11. When no external force is applied, the proof mass 10 is at a stationary position, the first comb-shaped electrodes 12 are connected with the proof mass 10, the second comb-shaped electrodes 13 are disposed corresponding to the first comb-shaped electrodes 12, and the first comb-shaped electrodes 12 are aligned with the second comb-shaped electrodes 13 through a matching frame 15.

Figure 2:
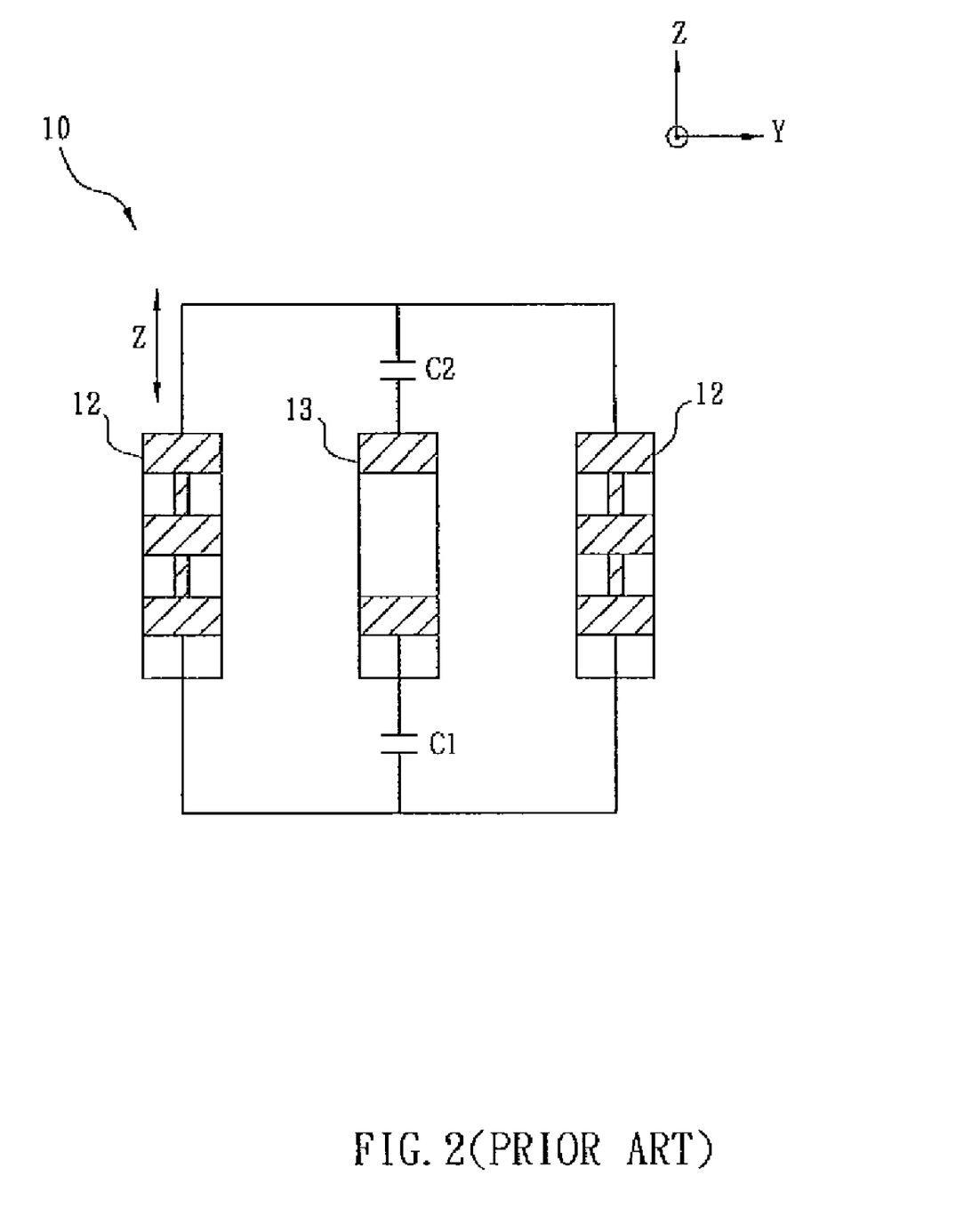
FIG. 2 is a cross-sectional view taken along an A-A line segment of FIG. 1.

As shown in FIG. 2, when an external force is applied to the proof mass 10 to shift the proof mass 10 in a Z-axis direction, the sensing area between the first comb-shaped electrode 12 and the second comb-shaped electrode 13 varies. Thus, the capacitance variation between the comb-shaped electrodes 12 and 13, i.e. capacitance variation between capacitors C1 and C2, can be measured to derive the acceleration value.

However, because the comb-shaped electrodes 12 and 13 have the longitudinal comb-shaped structures, and the thickness of each conductive layer formed in the CMOS manufacturing process is only several hundreds angstroms (Å), the area for sensing the capacitance variation between the first comb-shaped electrode 12 and the second comb-shaped electrode 13 is very small. Thus, the capacitance variation is smaller and may be hidden in the parasitical capacitance, thereby decreasing the sensing sensitivity. Consequently, a capacitance sensing circuit, which is complicated and precise, has to be adopted to detect the capacitance variation. In addition, the longitudinal comb-shaped electrodes 12 and 13 may be deformed due to the residual stresses produced in the manufacturing processes and the insufficient rigidity thereof, thereby influencing the resolution of sensing the capacitance variation.

In addition, since the conventional structure does not provide a test electrode and a mechanical limit stop, the sensing structure has to be operated and tested carefully after being manufactured. When the exceeding acceleration variation is inputted, the sensing structures contact each other to form the short-circuited condition, and the unrecoverable functional damage may be caused. In addition, since a feedback control circuit is also designed without the consideration of the test electrode, the precision of the sensed value and thus the sensing range are also influenced when the capacitance variation is increased non-linearly. If the test electrode has to be disposed additionally, the manufacturing process and cost for the test electrode are needed and the circuit layout becomes more complicated.

Therefore, it is an important subject to provide a capacitance sensing structure capable of overcoming the above-mentioned problems.

SUMMARY OF THE INVENTION

In view of the foregoing, the invention is to provide a capacitance sensing structure capable of enhancing a resolution on a variation of a sensed capacitance, enhancing the performance of the sensing structure, and reducing the complexity and the cost in the manufacturing process.

In addition, the invention also provides a capacitance sensing structure having a test electrode and a mechanical limit stop, which can be integrated in the sensing structure.

To achieve the above, the invention provides a capacitance sensing structure, which includes a substrate, a sensing electrode layer, a stack layer and a conductive body. The sensing electrode layer is formed on the substrate. The stack layer is formed on the sensing electrode layer. The conductive body is disposed over and corresponding to the sensing electrode layer and the stack layer.

As mentioned above, the capacitance sensing structure of the invention is formed between the sensing electrode layer and the conductive layers of the conductive body by the CMOS manufacturing process in conjunction with the processes of forming the suspended micro-structure. The sensing electrode layer and the conductive layers are disposed corresponding to each other, and therefore the area of the sensing capacitor may be broadened. The sensing electrode layer may be disposed on the substrate or formed in the substrate. Compared with the prior art, the test electrode and the mechanical limit stop can be integrated at different heights and therefore, the spatial arrangement can be effectively saved, the performance of the sensing structure can be enhanced, the process complexity and the manufacturing cost can be reduced, and the resolution of the capacitance variation can be further increased.

BRIEF DESCRIPTION OF THE DRAWINGS

The present invention will become more fully understood from the subsequent detailed description and the accompanying drawings, which are given by way of illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Referring to FIGS. 3 to 7, a capacitance sensing structure 2 according to an embodiment of the invention includes a substrate 20, a sensing electrode layer 21 and a conductive body 23. In this embodiment, the capacitance sensing structure 2 is manufactured by the CMOS manufacturing technology and may serve as an accelerometer, or be applied to a gyroscope or a MEMS. Herein, the capacitance sensing structure 2 serves as, for example but not limited to, the accelerometer.

The sensing electrode layer 21 is disposed on the substrate 20 (see FIGS. 4 and 5) by the CMOS manufacturing process. The substrate 20 may be a silicon (e.g., polysilicon) substrate, a silicon on glass (SOG) substrate or a glass substrate. The sensing electrode layer 21 may be made of polysilicon, metal silicide, metal, an alloy or combinations thereof, and the metal may be tungsten, aluminum, copper or combinations thereof.

Figure 6:
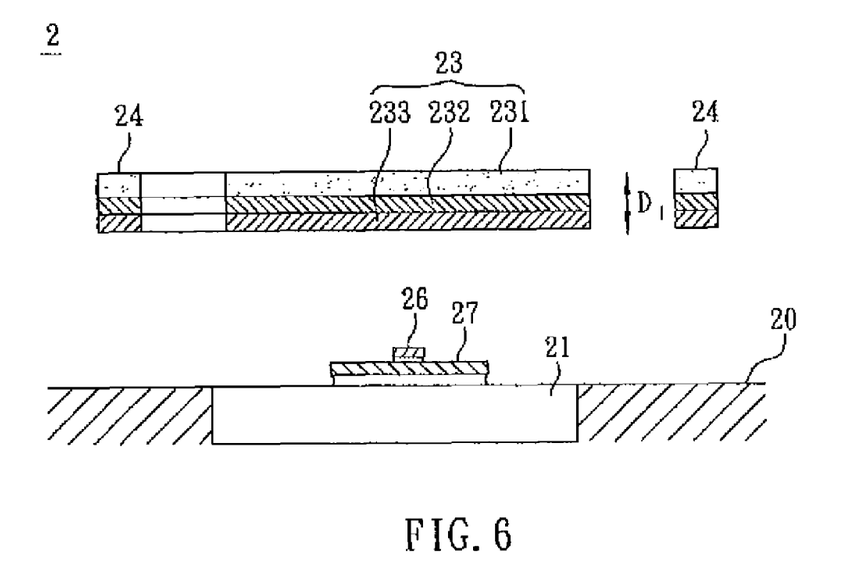
Figure 7:
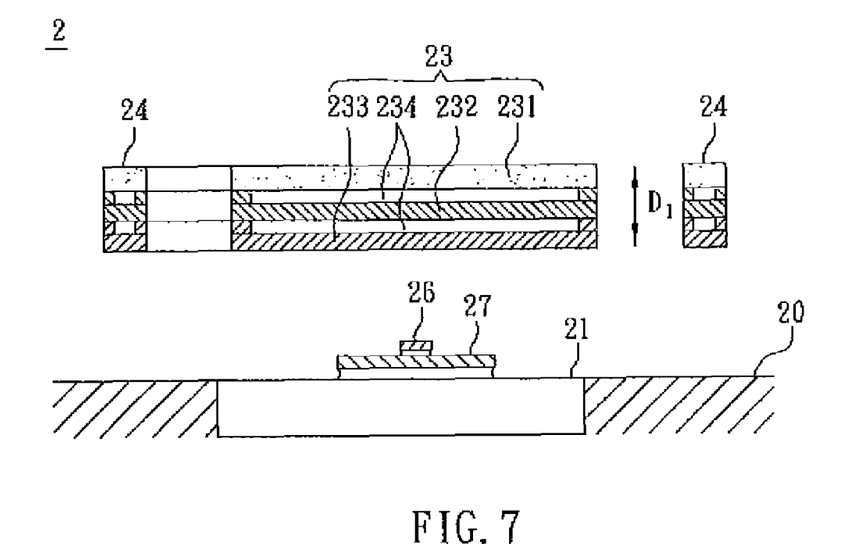

In addition to be disposed on the substrate 20, the sensing electrode layer 21 may also be formed in the substrate 20 by doping at least one impurity to form a semiconductor doping region on the surface of the substrate 20 (see FIGS. 6 and 7). In the embodiment, the doping method may be a diffusion method or an ion implantation method. If the substrate 20 is, for example, a silicon substrate, the p-type semiconductor doping region can be formed by doping boron and gallium, and the n-type semiconductor doping region can be formed by doping phosphorus and arsenic.

Figure 4:
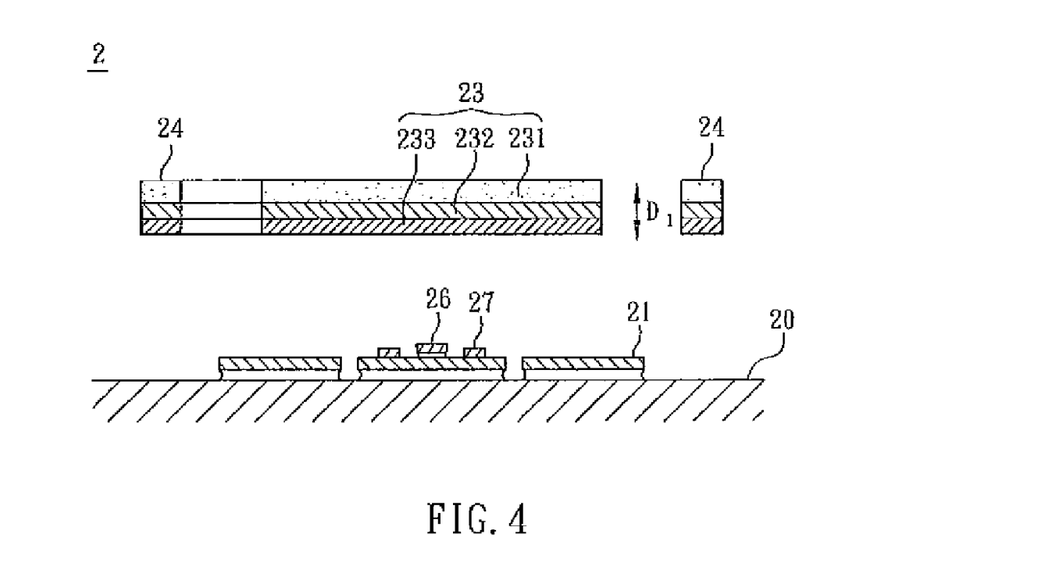
FIG. 4 is a cross-sectional view taken along a B-B line segment of FIG. 3.

The conductive body 23 disposed above and opposite to the sensing electrode layer 21 may be movable and has a longitudinal and flat shape. The conductive body 23 has a proof mass 231, a first conductive layer 232 and a second conductive layer 233. The first and second conductive layers 232, 233 are sequentially stacked on one side of the proof mass 231 facing the substrate 20, as shown in FIGS. 4 and 6, to form a capacitance sensing structure with the sensing electrode layer 21. The resolution of sensing the capacitance variation is increased by broadening the sensing area. In this embodiment, the proof mass 231 may also be omitted because the first conductive layer 232 and the second conductive layer 233 have their own weights. In addition, although the conductive body 23 has two conductive layers 232 and 233 in the illustrated embodiment the number of layers may be modified according to the requirement or the specification of the manufacturing process. In addition, the first conductive layer 232 and the second conductive layer 233 may be made of different materials. In this embodiment, the first and second conductive layers 232, 233 may be made of polysilicon, metal silicide, metal, a metal alloy or combinations thereof, respectively, and the metal may be tungsten, aluminum, copper or combinations thereof.

Figure 5:
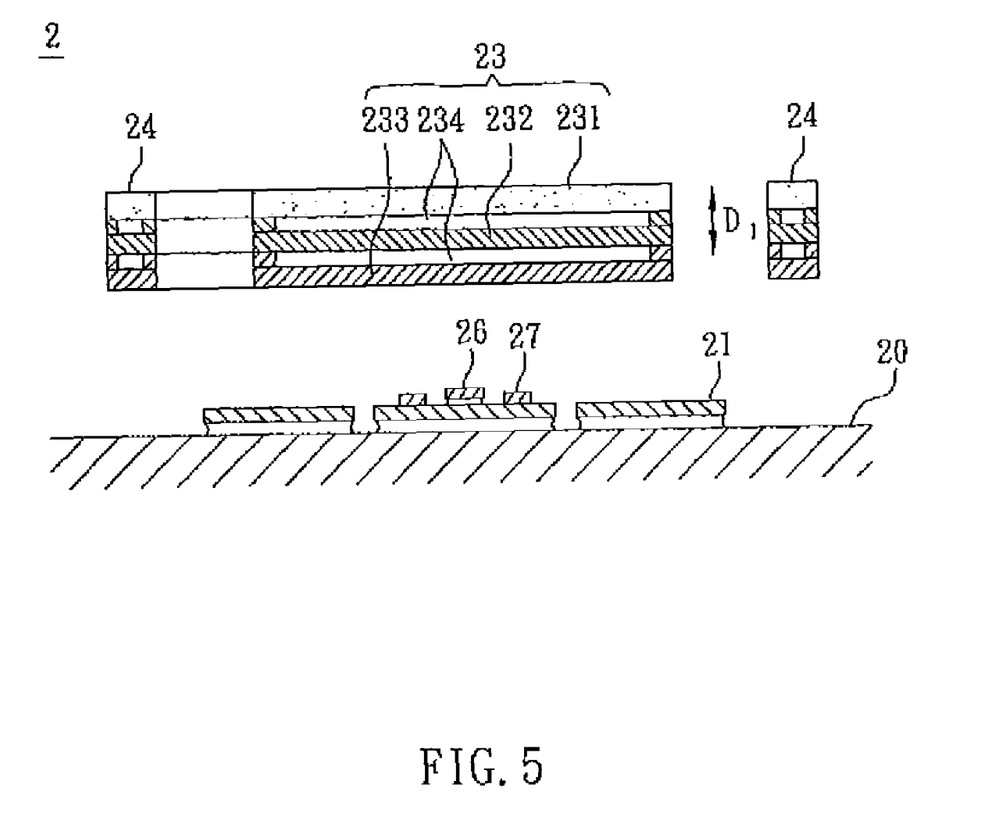
FIGS. 5 to 7 are cross-sectional views showing another capacitance sensing structures according to the embodiments of the invention.

In addition, dielectric layers 234 may be respectively disposed between the first conductive layer 232 and the second conductive layer 233 and between the first conductive layer 232 and the proof mass 231, as shown in FIG. 5. The conductive layers 232 and 233 and the dielectric layers 234 are stacked together by the CMOS manufacturing process so that the conductive layers 232 and 233 cover the dielectric layers 234. In this embodiment, the dielectric layer 234 may be made of silicon oxide, silicon nitride or silicon oxy-nitride.

Figure 3:
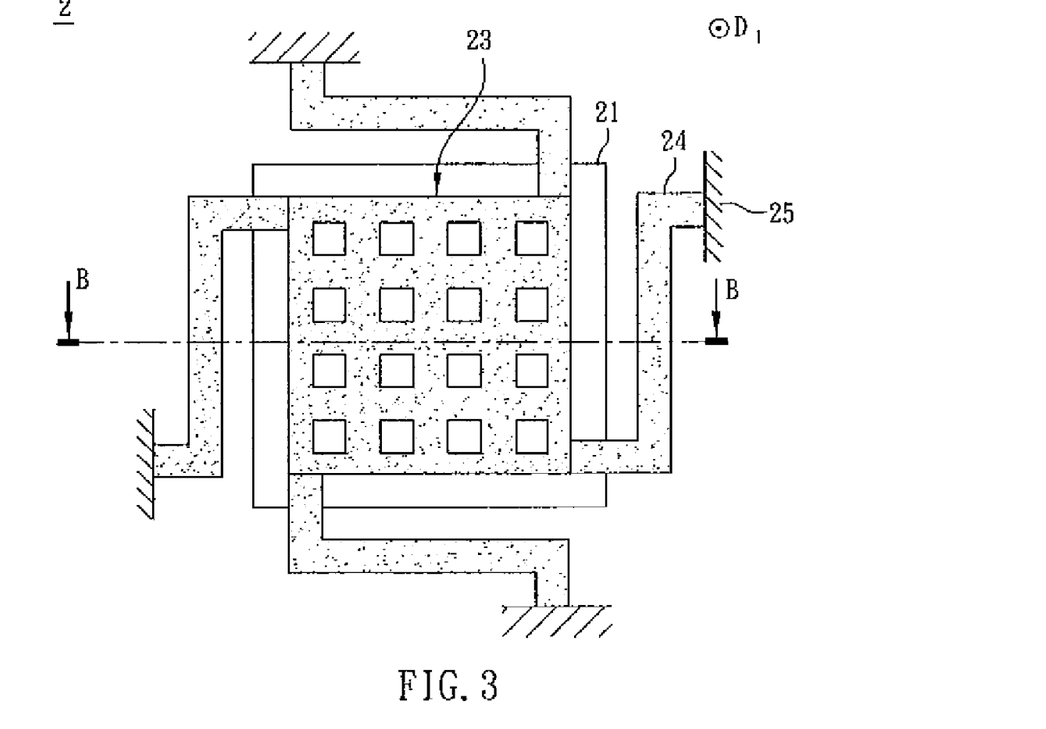
FIG. 3 is a top view showing a capacitance sensing structure according to an embodiment of the invention.

As shown in FIG. 3, the conductive body 23 is connected with at least one fixing end 25 through at least one flexible member 24. In this embodiment, the flexible members 24 are respectively connected to four corners of the conductive body 23 and the fixing end 25 so that the conductive body 23 can move in a first-axis direction $D_1$. Herein, the flexible member 24 may be a spring.

Referring to FIGS. 4 to 7, the capacitance sensing structure 2 may further include a stack layer, which is a stopping element 26 in this embodiment to be a mechanical limit stop. The stack layer may be disposed between the substrate 20 and the conductive body 23 by the CMOS manufacturing process. Preferably, the stopping element 26 is formed below the conductive body 23 and disposed on the sensing electrode layer 21 so that at least two CMOS layer stacks having at least two heights may be disposed over the substrate 20. In this embodiment, the sensing electrode layer 21 provides a CMOS layer stack having a first height and the stopping element 26 provides a CMOS layer stack having a second height. Thus, when the exceeding driving signal (e.g., acceleration) is inputted to the capacitance sensing structure 2, the stopping element 26 provides a mechanical limit stop, for preventing the conductive body 23 from contacting the sensing electrode layer 21. Therefore, the capacitance sensing structure 2 can be prevented from having the short-circuited condition and is thus damaged.

In addition, the capacitance sensing structure 2 may further include a stack layer, which may be a test electrode layer 27 selectively disposed on the substrate 20 or the sensing electrode layer 21. That is, the test electrode layer 27 and the sensing electrode layer 21 may be formed on the same plane, and also may be formed on the sensing electrode layer 21 and have different heights, as shown in FIG. 4. In this embodiment, the test electrode layer 27 is not electrically connected with the sensing electrode layer 21, and the test electrode layer 27 provides the capacitance sensing structure 2 a self-testing function of verifying the performance. In addition, a feedback control circuit (not shown) may also be provided to broaden the sensing range of the capacitance sensing structure 2 so that the better linearity may be possessed when the smaller capacitance variation is being sensed.

Figure 8:
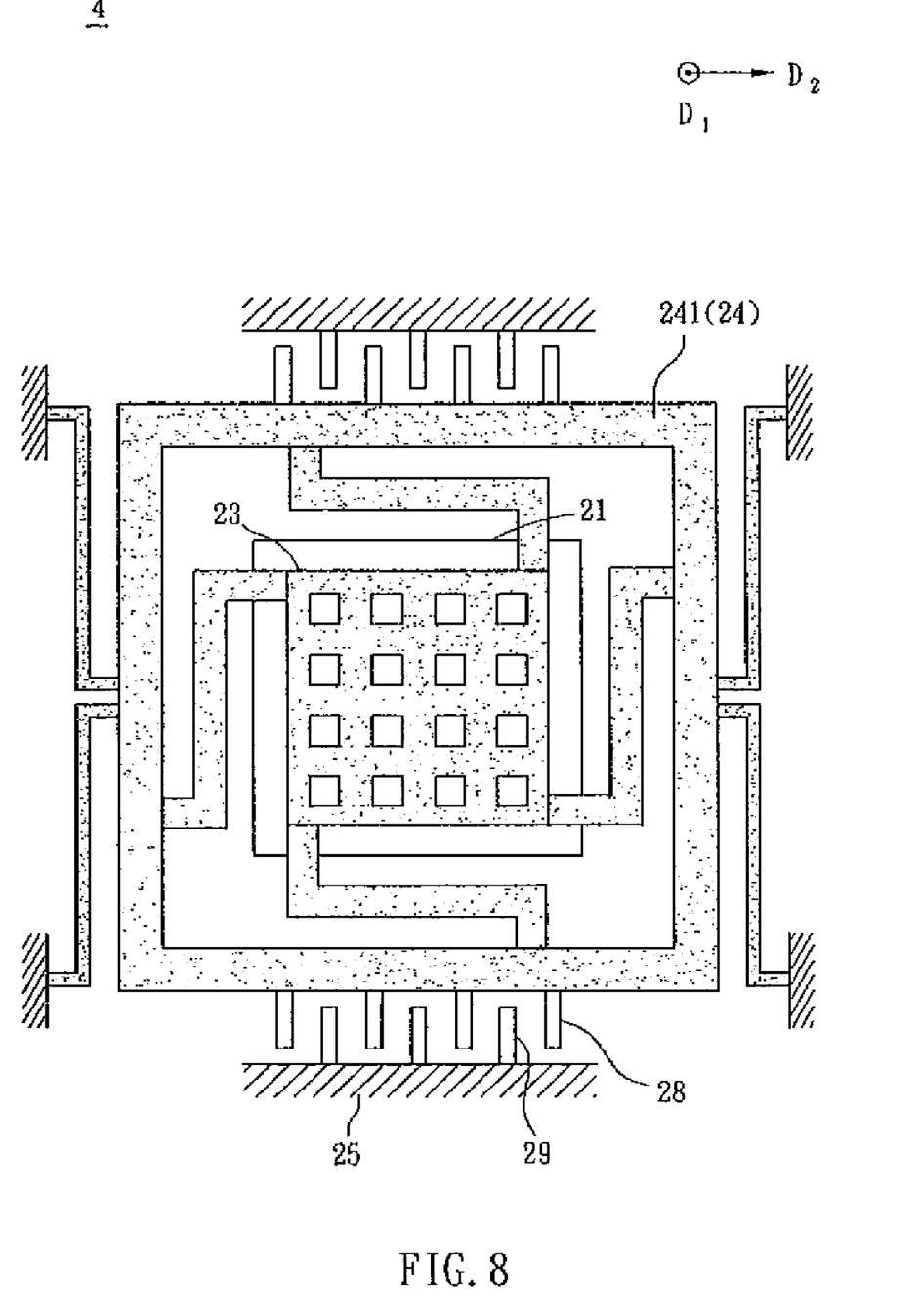
FIG. 8 is a top view showing a dual-axis capacitance sensing structure according to the embodiment of the invention.

As shown in FIG. 8, in order to add a second-axis sensing direction to form a dual-axis capacitance sensing structure 4, the structure 4 may further include first conductive portions 28, which are disposed in parallel and on one side of the conductive body 23. In this embodiment, the first conductive portions 28 are disposed on opposite sides of the conductive body 23, and the capacitance sensing structure 4 further includes second conductive portions 29 disposed corresponding to the first conductive portions 28. In this embodiment, the flexible member 24 may further include a first matching frame 241. The first conductive portions 28 are connected with the first matching frame 241, and the second conductive portions 29 are disposed on the fixing end 25 in parallel. The first matching frame 241 provides the alignments of the first conductive portions 28 with the second conductive portions 29 and enables the first conductive portions 28 and the second conductive portions 29 to be disposed in a finger-interdigital manner. Thus, when the conductive body 23 is driven to move toward a second-axis direction $D_2$, the sensing function of the capacitance sensing structure 4 on the second-axis direction $D_2$ may be enhanced by the capacitance variation caused by the displacements between the first conductive portions 28 and the second conductive portions 29.

Figure 9:
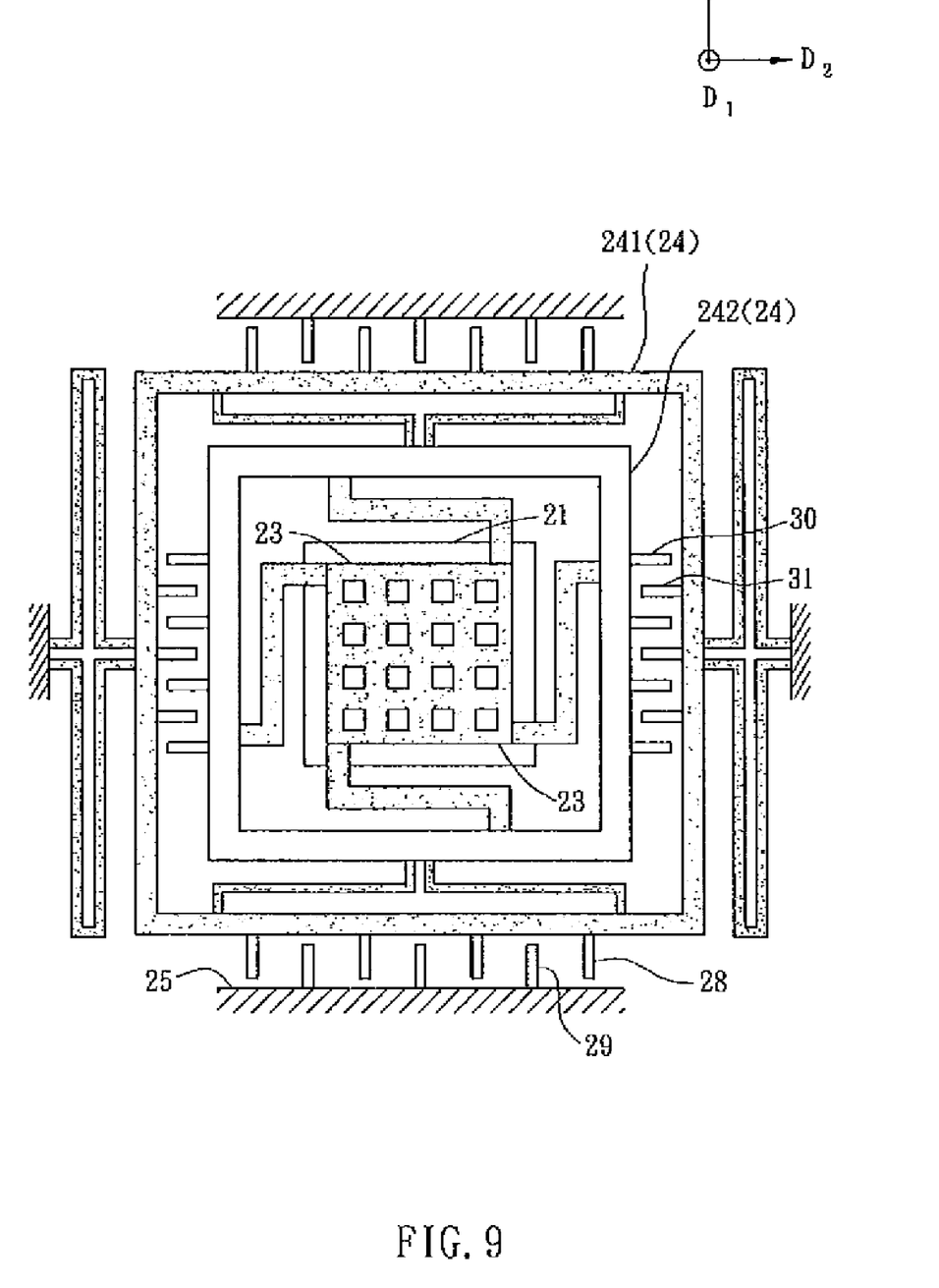
FIG. 9 is a top view showing a three-axis capacitance sensing structure according to the embodiment of the invention.

As shown in FIG. 9, the invention may also include a third-axis sensing direction to become a three-axis capacitance sensing structure 5. Thus, the capacitance sensing structure 5 may further include third conductive portions 30 disposed in parallel and on at least another side of the conductive body 23 (i.e., on another side of the conductive body 23 corresponding to the conductive portions 28 and 29 for the second-axis direction $D_2$). The capacitance sensing structure 5 further includes fourth conductive portions 31 disposed corresponding to the third conductive portions 30. In this embodiment, the flexible member 24 may further include a second matching frame 242. The third conductive portions 30 are connected with the second matching frame 242, and the fourth conductive portions 31 are connected with the first matching frame 241. The third conductive portions 30 are aligned with the fourth conductive portions 31 and arranged in a finger-interdigital manner through the first matching frame 241 and the second matching frame 242. Thus, when the conductive body 23 is driven to move toward a third-axis direction $D_3$, the sensing function of the capacitance sensing structure 5 on the third-axis direction $D_3$ may be enhanced by the capacitance variation caused by the displacements between the third conductive portions 30 and the fourth conductive portions 31.

The first conductive portions 28, the second conductive portions 29, the third conductive portions 30 and the fourth conductive portions 31 may also be manufactured by the CMOS manufacturing technology.

Figure 10:
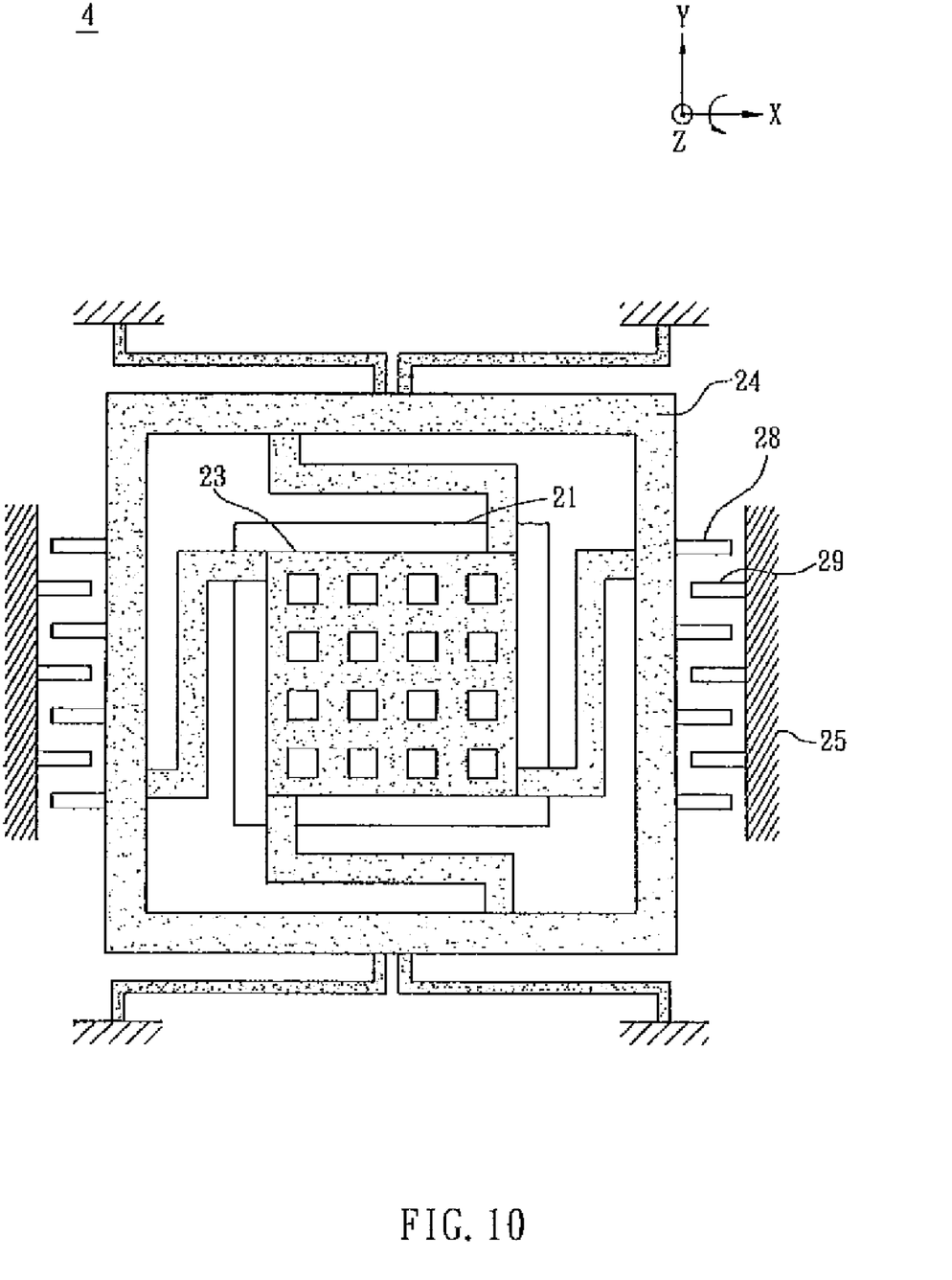
FIG. 10 is a top view showing the dual-axis capacitance sensing structure applied to a gyroscope according to the embodiment of the invention.

Finally, as shown in FIG. 10, when the capacitance sensing structure 4 is applied to a gyroscope, the first conductive portions 28 and the second conductive portions 29 may be driven relative to each other so that the conductive body 23 is driven to move in the Y-axis direction. The angular velocity in the X-axis direction may be derived by sensing the capacitance variation in the Z-axis direction.

In summary, the capacitance sensing structure of the invention is formed between the sensing electrode layer and the conductive layers of the conductive body by the CMOS manufacturing process in conjunction with the processes of forming the suspended micro-structure. The sensing electrode layer and the conductive layers are disposed correspondingly to each other and therefore the area of the sensing capacitor may be broadened. The sensing electrode layer may be disposed on the substrate or formed in the substrate. Compared with the prior art, the test electrode and the mechanical limit stop can be integrated at different heights, so as to effectively save the spatial arrangement, enhance the performance of the sensing structure, reduce the process complexity and the manufacturing cost, and further increase the resolution of the capacitance variation.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A capacitance sensing structure comprising:
 a substrate;
 a sensing electrode layer formed on or in the substrate;
 at least one stack layer formed on the sensing electrode layer; and
 a conductive body disposed over and opposite to the sensing electrode layer and the stack layer,
 wherein the conductive body is connected with at least one fixing end through at least one flexible member or spring.

2. The capacitance sensing structure according to claim 1, wherein a surface of the sensing electrode layer and a surface of the substrate are disposed on the same plane.

3. The capacitance sensing structure according to claim 1, wherein the sensing electrode layer is a semiconductor doping region of the substrate doped with boron, gallium, phosphorus or arsenic by way of diffusion or ion implantation.

4. The capacitance sensing structure according to claim 1, wherein the substrate has at least two CMOS layer stacks with different heights, and the CMOS layer stacks comprise the sensing electrode layer and a test electrode layer or a stopping element.

5. The capacitance sensing structure according to claim 1, further comprising a test electrode layer disposed on the substrate or the sensing electrode layer, wherein the test electrode layer is applied for feedback control to broaden a sensing range.

6. The capacitance sensing structure according to claim 1, further comprising a stopping element disposed on the sensing electrode layer or between the substrate and the conductive body, wherein the stopping element serves as a mechanical limit stop for preventing the conductive body from contacting the sensing electrode layer.

7. The capacitance sensing structure according to claim 1, wherein the conductive body comprises a first conductive layer, a second conductive layer, and a dielectric layer interposed between the first and second conductive layers.

8. The capacitance sensing structure according to claim 7, wherein the first or second conductive layer is made of polysilicon, metal silicide, metal, a metal alloy or combinations thereof, and the dielectric layer is made of silicon oxide, silicon nitride or silicon oxy-nitride.

9. The capacitance sensing structure according to claim 8, wherein the metal is tungsten, aluminum, copper or combinations thereof.

10. The capacitance sensing structure according to claim 7, wherein the conductive body further comprises a proof mass, and the first conductive layer and the second conductive layer are stacked in sequence and disposed on one side of the proof mass facing the substrate.

11. The capacitance sensing structure according to claim 10, wherein a second dielectric layer is interposed between the proof mass and the first conductive layer.

12. The capacitance sensing structure according to claim 1, wherein the conductive body is moved in a direction perpendicular to the sensing electrode layer.

13. The capacitance sensing structure according to claim 1, further comprising a plurality of first conductive portions disposed on at least one side of the conductive body, and a plurality of second conductive portions disposed corresponding to the first conductive portions.

14. The capacitance sensing structure according to claim 13, wherein the first conductive portions are connected with a first matching frame, and the first matching frame is further connected with the conductive body through a flexible member, and wherein the second conductive portions are disposed in parallel and disposed on a fixing end.

15. The capacitance sensing structure according to claim 14, wherein the first conductive portions and the second conductive portions are disposed in a finger-interdigital manner.

16. The capacitance sensing structure according to claim 13, further comprising a plurality of third conductive portions disposed on another side of the conductive body, and a plurality of fourth conductive portions disposed opposite to the third conductive portions.

17. The capacitance sensing structure according to claim 16, wherein the first conductive portions are connected to one side of a first matching frame, the third conductive portions are connected to a second matching frame, the second matching frame is further connected to the conductive body through an flexible member, and the fourth conductive portions are connected to another side of the first matching frame.

18. The capacitance sensing structure according to claim 16, wherein the third conductive portions and the fourth conductive portions are disposed in a finger-interdigital manner.

19. The capacitance sensing structure according to claim 1, wherein the capacitance sensing structure is applied to an accelerometer, dual-axis accelerometer, three-axis accelerometer, gyroscope or micro-electromechanical system (MEMS).

20. The capacitance sensing structure according to claim 1, wherein a material of the substrate is a silicon substrate, a silicon on glass (SOG) substrate or a glass substrate, and a material of the sensing electrode layer is polysilicon, metal silicide, metal, an alloy or their combinations.

* * * * *